United States Patent
Sun et al.

(10) Patent No.: US 11,343,192 B2
(45) Date of Patent: May 24, 2022

(54) PACKET PROCESSING METHOD, AND DEVICE

(71) Applicant: Huawei Technologies Co., Ltd., Shenzhen (CN)

(72) Inventors: Guanghui Sun, Mexico City (MX); Yang Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/220,520

(22) Filed: Dec. 14, 2018

(65) Prior Publication Data

US 2019/0124704 A1    Apr. 25, 2019

Related U.S. Application Data

(63) Continuation of application No. PCT/CN2017/084936, filed on May 18, 2017.

(30) Foreign Application Priority Data

Jun. 15, 2016   (CN) .......................... 201610427862.1

(51) Int. Cl.
*H04L 12/851*    (2013.01)
*H04W 48/18*    (2009.01)
(Continued)

(52) U.S. Cl.
CPC ............. *H04L 47/24* (2013.01); *H04W 4/025* (2013.01); *H04W 4/20* (2013.01); *H04W 28/24* (2013.01);
(Continued)

(58) Field of Classification Search
None
See application file for complete search history.

(56) References Cited

U.S. PATENT DOCUMENTS

| | | |
|---|---|---|
| 4,863,745 A | 9/1989 | Zibell |
| 2004/0179526 A1 | 9/2004 | Cypher |

(Continued)

FOREIGN PATENT DOCUMENTS

| | | |
|---|---|---|
| CN | 201302338 Y | 9/2009 |
| CN | 102868991 A | 1/2013 |

(Continued)

OTHER PUBLICATIONS

Machine Translation and Abstract of Chinese Publication No. CN102868991, Jan. 9, 2013, 33 pages.

(Continued)

*Primary Examiner* — Christopher M Crutchfield
*Assistant Examiner* — Alan L Lindenbaum
(74) *Attorney, Agent, or Firm* — Conley Rose, P.C.

(57) ABSTRACT

A packet processing method, where a server allocates an identifier of a network slice to a terminal device based on a service type of the terminal device and sends the identifier of the network slice to a control device. The control device determines parameter information of the network slice based on the identifier and determines a forwarding path based on the parameter information. Then, the control device adds a forwarding resource included in the forwarding path to a forwarding resource of the network slice. When the terminal device sends the service packet, the service packet is forwarded using the forwarding resource of the network slice. Hence, the control device dynamically determines the forwarding resource for the network slice based on a service requirement such that a forwarding resource in a network can be fully used, saving forwarding resource and improving network flexibility.

4 Claims, 8 Drawing Sheets

```
┌──────────────────────────────────────────────────────────────┐
│   S601. A server receives a first packet sent by a terminal device │
└──────────────────────────────────────────────────────────────┘
                              │
┌──────────────────────────────────────────────────────────────┐
│ S602. The server determines an identifier of a network slice based on an │
│    entry of a mapping relationship between a service identifier and the │
│                          network slice                        │
└──────────────────────────────────────────────────────────────┘
                              │
┌──────────────────────────────────────────────────────────────┐
│ S603. The server sends a second packet to the terminal device, where the │
│      second packet includes the identifier of the network slice │
└──────────────────────────────────────────────────────────────┘
                              │
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ S604. The server allocates an IP address to the terminal device based on │
│                      location information                      │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

(51) Int. Cl.
*H04W 4/20* (2018.01)
*H04W 76/10* (2018.01)
*H04W 76/11* (2018.01)
*H04W 4/02* (2018.01)
*H04W 28/24* (2009.01)
*H04L 47/24* (2022.01)

(52) U.S. Cl.
CPC ........... *H04W 48/18* (2013.01); *H04W 76/10* (2018.02); *H04W 76/11* (2018.02)

(56) References Cited

U.S. PATENT DOCUMENTS

| | | | |
|---|---|---|---|
| 2013/0339429 | A1 | 12/2013 | Richardson et al. |
| 2015/0188815 | A1 | 7/2015 | Liu et al. |
| 2017/0214548 | A1 | 7/2017 | Ogura |
| 2017/0353490 | A1* | 12/2017 | Krauss ................ H04L 63/1491 |
| 2019/0021047 | A1* | 1/2019 | Zong ..................... H04W 76/11 |
| 2019/0141760 | A1* | 5/2019 | Stille ..................... H04W 76/12 |

FOREIGN PATENT DOCUMENTS

| | | |
|---|---|---|
| CN | 103650437 A | 3/2014 |
| CN | 104601742 A | 5/2015 |
| JP | 2002176444 A | 6/2002 |
| JP | 2012191263 A | 10/2012 |
| KR | 20150076118 A | 7/2015 |
| WO | 2014142278 A1 | 9/2014 |
| WO | 2016004301 A1 | 1/2016 |
| WO | 2016017182 A1 | 2/2016 |

OTHER PUBLICATIONS

Machine Translation and Abstract of Chinese Publication No. CN104601742, May 6, 2015, 17 pages.
Foreign Communication From a Counterpart Application, Chinese Application No. 201610427862.1, Chinese Office Action dated Sep. 4, 2019, 8 pages.
Machine Translation and Abstract of Japanese Publication No. JP2002176444, Jun. 21, 2002, 19 pages.
Machine Translation and Abstract of Japanese Publication No. JP2012191263, Oct. 4, 2012, 18 pages.
Samsung, "Solution for Network Slice Selection based on the NG UE's service context," S2-162622, May 17, 2016, 4 pages.
Catt, "Network slicing architecture and slice selection mechanism," S2-162652, 3GPP TSG-SA WG2#115, May 17, 2016, 3 pages.
Huawei, et al., "UE Slice Association/Overload control Procedure," S2-163161, 3GPP TSG SA WG2, Meeting #115, May 27, 2016, 6 pages.
Foreign Communication From a Counterpart Application, Japanese Application No. 2018-565827, Japanese Office Action dated Nov. 12, 2019, 5 pages.
Foreign Communication From a Counterpart Application, Japanese Application No. 2018-565827, English Translation of Japanese Office Action dated Nov. 12, 2019, 5 pages.
Machine Translation and Abstract of Chinese Publication No. CN103650437, Mar. 19, 2014, 63 pages.
"3rd Generation Partnership Project; Technical Specification Group Services and System Aspects; Architecture Enhancements for Dedicated Core Networks; Stage 2 (Release 13)," 3GPP TR 23.707, V13.0.0, Dec. 2014, 39 pages.
"3rd Generation Partnership Project; Technical Specification Group Services and System Aspects; Study on Architecture for Next Generation System (Release 14)," 3GPP TR 23.799, V0.4.0, Apr. 2016, 96 pages.
Li, Q., et al., "An end-to-end network slicing framework for 5G wireless communication systems," ESTI Workshop on Future Radio Technologies: Air Interfaces, Jan. 28, 2016, 13 pages.
Foreign Communication From a Counterpart Application, PCT Application No. PCT/CN2017/084936, English Translation of International Search Report dated Jul. 25, 2017, 3 pages.
Foreign Communication From a Counterpart Application, PCT Application No. PCT/CN2017/084936, English Translation of Written Opinion dated Jul. 25, 2017, 6 pages.
Foreign Communication From a Counterpart Application, European Application No. 17812512.6, Extended European Search Report dated Mar. 19, 2019, 11 pages.

* cited by examiner

S501. A terminal device sends a first packet to a server, where the first packet includes a service identifier of the terminal device S502. The terminal device receives a second packet sent by the server, where the second packet includes an identifier of a network slice S503. The terminal device sends a third packet to a forwarding device, where the third packet includes the identifier of the network slice S504. The terminal device sends a fourth packet to the server, where the fourth packet includes location information of the terminal device S505. The terminal device receives a fifth packet sent by the server, where the fifth packet includes an IP address

FIG. 5

S601. A server receives a first packet sent by a terminal device

S602. The server determines an identifier of a network slice based on an entry of a mapping relationship between a service identifier and the network slice S603. The server sends a second packet to the terminal device, where the second packet includes the identifier of the network slice S604. The server allocates an IP address to the terminal device based on location information

FIG. 6

PACKET PROCESSING METHOD, AND DEVICE

CROSS-REFERENCE TO RELATED APPLICATIONS

This application is a continuation of International Patent Application No. PCT/CN2017/084936 filed on May 18, 2017, which claims priority to Chinese Patent Application No. 201610427862.1 filed on Jun. 15, 2016. The disclosures of the aforementioned applications are hereby incorporated by reference in their entireties.

TECHNICAL FIELD

This application relates to the communications field, and in particular, to a packet processing method and a device.

BACKGROUND

A mobile terminal first sends a data packet to a base station in a form of a radio signal during communication. The base station performs, based on a tunnel pre-established between the base station and a gateway in a core network, new encapsulation on the packet according to a protocol required by the tunnel, and then sends the packet to a forwarding device connected to the base station such that the packet is further transmitted in a network in which a network device is located.

A $5^{th}$ generation (5G) mobile network allows hundred billions of mobile terminals to access a network. For example, terminal devices accessing the network may be a mobile phone focusing on voice and video services, or may be various Internet of Things (IoT) devices. Different mobile terminals or different services of mobile terminals have different network quality of service (QoS) requirements. For example, a video service requires a relatively high bandwidth, and remote operation services such as self-driving and remote surgery have a general requirement for a bandwidth but have an extremely high requirement for low delay and reliability. QoS of the pre-established tunnel is fixed and cannot be flexibly adjusted based on a service requirement. Consequently, Internet access requirements of different terminal devices in the 5G mobile network cannot be met.

In addition, in the 5G mobile network, a large quantity of terminal devices access the network, and therefore a requirement is imposed on deployment of the base station. A base station having functions of tunnel negotiation and upper-layer protocol encapsulation needs to have a relatively strong computing capability. Consequently, deployment costs are high, and a requirement for extensive deployment in the 5G network cannot be met.

SUMMARY

Embodiments of this application provide a packet processing method, a device, and a system, to resolve a technical problem that a forwarding resource cannot be adjusted based on a service requirement.

According to a first aspect, an embodiment of this application provides a packet processing method, where the method includes receiving, by a control device, a first packet sent by a server, where the first packet includes an identifier of a network slice and the identifier of the network slice is used to identify the network slice, determining, by the control device, parameter information of the network slice based on the identifier of the network slice, determining, by the control device based on the parameter information, a forwarding path from a first edge node of a first network to a second edge node of the first network, where the first edge node is configured to send a packet sent by a terminal device to the first network and the second edge node is configured to send the packet sent by the terminal device to a second network, and adding, by the control device, a forwarding resource included in the forwarding path to a forwarding resource of the network slice, where the forwarding path is used to forward a packet carrying the identifier of the network slice.

In the foregoing solution, the control device dynamically establishes, based on an identifier that is of a network slice and that is sent by the server, a forwarding path that meets parameter information of the network slice such that the control device may dynamically determine a forwarding resource for the network slice based on a service requirement in a network. In this way, a forwarding resource in the network may be used to forward packets of different network slices based on requirements in different time periods. When a forwarding requirement of a network slice changes, the control device can quickly adjust a forwarding resource of the network slice such that the forwarding resource in the network can be fully used, saving the forwarding resource. In addition, when parameter information of the network slice changes, the control device may adjust the forwarding resource in the network slice accordingly in a timely manner based on a change of the parameter information, improving network flexibility.

Optionally, the first packet further includes an identifier of the terminal device, and the method further includes sending, by the control device, a second packet to the terminal device based on the identifier of the terminal device, where the second packet includes the identifier of the network slice, the identifier of the network slice is added to a third packet by the terminal device and sent to the first edge node, and the identifier of the network slice is used to instruct the first edge node to use the forwarding resource of the network slice to forward the third packet.

Optionally, the first packet further includes location information of the terminal device, and before determining, by the control device based on the parameter information, a forwarding path from a first edge node of a first network to a second edge node of the first network, the method includes determining, by the control device, the first edge node based on the location information.

With the location information of the terminal device being obtained and the first edge node of the forwarding path being determined based on the location information, the established forwarding path may be directly used to forward a service of the terminal device. When a location of the terminal device changes, the forwarding path may further be adjusted based on a change of the location of the terminal device, thereby further enhancing network flexibility.

Optionally, the first packet further includes location information of the terminal device, and after receiving, by a control device, a first packet, the method further includes allocating, by the control device, an Internet Protocol (IP) address to the terminal device based on the location information, wherein the IP address is used as a source IP address of the third packet sent by the terminal device and the third packet is a service packet sent by the terminal device.

The control device allocates the source IP address to the terminal device based on the location information of the terminal device. In this way, when a remote device communicating with the terminal device sends a return packet to the terminal device, a forwarding device in the network may directly determine, based on a destination IP address of the return packet, which base station or which forwarding device that is connected to the base station the return packet should be sent to. Therefore, for bidirectional packets for communication between the terminal device and the remote device, the base station does not need to encapsulate another IP header or other upper-layer protocol header on an outer layer of the packet again. This helps reduce a computing resource required by the base station.

Optionally, the parameter information includes an identifier of the second edge node, and before determining, by the control device based on the parameter information, a forwarding path from a first edge node of a first network to a second edge node of the first network, the method includes determining, by the control device, the second edge node based on the parameter information.

The second edge node is pre-stored in the parameter information, and the edge node may be quickly determined when different network slices have different edge nodes.

Optionally, the parameter information includes a quality of service parameter, and correspondingly, the control device determines the forwarding path based on the QoS parameter.

The control device determines the forwarding path based on the QoS parameter, and the control device may flexibly configure a forwarding resource for the forwarding path of the network slice based on a service forwarding requirement of the network slice. This helps provide a service forwarded on the network slice with a QoS guarantee that meets a requirement.

According to a second aspect, a packet processing method is provided, where the method includes sending, by a terminal device, a first packet to a server, where the first packet includes a service identifier of the terminal device and the first packet is used to request, from the server, an identifier of a network slice that is corresponding to the service identifier, receiving, by the terminal device, a second packet sent by the server, where the second packet includes the identifier of the network slice, and sending, by the terminal device, a third packet to a forwarding device, where the third packet includes the identifier of the network slice and the identifier of the network slice is used to instruct the forwarding device to use a forwarding resource of the network slice to forward the third packet.

In the foregoing solution, before sending a service, the terminal device requests the server to allocate, based on a service type, an identifier of a network slice to the terminal device and adds the identifier of the network slice to the packet such that the packet is forwarded using a forwarding resource of the network slice. A forwarding path in the network slice is configured based on a feature required by a service that is to be sent by the terminal device. Therefore, a network can provide different services for services of different terminal devices, improving network flexibility and forwarding quality.

Optionally, before sending, by the terminal device, a third packet to a forwarding device, the method further includes sending, by the terminal device, a fourth packet to the server, where the fourth packet includes location information of the terminal device and the fourth packet is used to request an IP address from the server, and receiving, by the terminal device, a fifth packet sent by the server, where the fifth packet includes the IP address and the IP address is used as a source IP address of the third packet sent by the terminal device.

The terminal device sends the packet using the source IP address corresponding to a location of the terminal device.

When a remote device communicating with the terminal device sends a return packet to the terminal device, a forwarding device in the network may directly determine, based on a destination IP address of the return packet, which base station or which forwarding device that is connected to the base station the return packet should be sent to. Therefore, for bidirectional packets for communication between the terminal device and the remote device, the base station does not need to encapsulate another IP header or other upper-layer protocol header on an outer layer of the packet again. This helps reduce a computing resource required by the base station.

According to a third aspect, a packet processing method is provided, where the method includes receiving, by a server, a first packet sent by a terminal device, where the first packet includes a service identifier of the terminal device, determining, by the server, an identifier of a network slice based on an entry of a mapping relationship between the service identifier and the network slice, and sending, by the server, a second packet to the terminal device, where the second packet includes the identifier of the network slice, the identifier of the network slice is added to a third packet by the terminal device and sent to a forwarding device, and the identifier of the network slice is used to instruct the forwarding device to use a forwarding resource of the network slice to forward the third packet.

In the foregoing solution, the server allocates an identifier of a corresponding network slice to the terminal device based on a service requirement of the terminal device such that a service sent by the terminal device is forwarded using a forwarding resource of the network slice. A forwarding path in the network slice is configured based on a feature required by a service that is to be sent by the terminal device. Therefore, a network can provide different services for services of different terminal devices, improving network flexibility and forwarding quality.

Optionally, the first packet further includes location information of the terminal device, and the method further includes allocating, by the server, an IP address to the terminal device based on the location information, where the IP address is used as a source IP address of the third packet sent by the terminal device.

The server allocates the source IP address to the terminal device based on the location information of the terminal device. When a remote device communicating with the terminal device sends a return packet to the terminal device, a forwarding device in the network may directly determine, based on a destination IP address of the return packet, which base station or which forwarding device that is connected to the base station the return packet should be sent to. Therefore, for bidirectional packets for communication between the terminal device and the remote device, the base station does not need to encapsulate another IP header or other upper-layer protocol header on an outer layer of the packet again. This helps reduce a computing resource required by the base station.

According to a fourth aspect, a control device is provided. The control device includes a receiving unit, a determining unit, a path establishment unit, and a processing unit, where the receiving unit is configured to receive a first packet sent by a server, where the first packet includes an identifier of a network slice and the identifier of the network slice is used to identify the network slice, the determining unit is configured to determine parameter information of the network slice based on the identifier of the network slice in the first packet received by the receiving unit, the path establishment unit is configured to determine, based on the parameter information determined by the determining unit, a forwarding path from a first edge node of a first network to a second edge node of the first network, where the first edge node is configured to send a packet sent by the terminal device to the first network and the second edge node is configured to send the packet sent by the terminal device to a second network, and the processing unit is configured to add a forwarding resource included in the forwarding path determined by the path establishment unit to a forwarding resource of the network slice, where the forwarding path is used to forward a packet carrying the identifier of the network slice.

Optionally, the first packet further includes an identifier of the terminal device, the control device further includes a sending unit, and the sending unit is configured to send a second packet to the terminal device based on the identifier of the terminal device that is received by the receiving unit, where the second packet includes the identifier of the network slice, the identifier of the network slice is added to a third packet by the terminal device and sent to the first edge node, and the identifier of the network slice is used to instruct the first edge node to use the forwarding resource of the network slice to forward the third packet.

Optionally, the first packet further includes location information of the terminal device, and before determining the forwarding path from the first edge node of the first network to the second edge node of the first network, the path establishment unit is further configured to determine the first edge node based on the location information.

Optionally, the determining unit is further configured to allocate an IP address to the terminal device based on the location information in the first packet, where the IP address is used as a source IP address of the third packet sent by the terminal device.

Optionally, the parameter information includes an identifier of the second edge node and the path establishment unit is further configured to before determining the forwarding path from the first edge node of the first network to the second edge node of the first network, determine the second edge node based on the parameter information.

According to a fifth aspect, a terminal device is provided. The terminal device includes a sending unit and a receiving unit, where the sending unit is configured to send a first packet to a server, where the first packet includes a service identifier of the terminal device and the first packet is used to request, from the server, an identifier of a network slice that is corresponding to the service identifier, the receiving unit is configured to after the sending unit sends the first packet, receive a second packet sent by the server, where the second packet includes the identifier of the network slice, and the sending unit is further configured to after the receiving unit receives the second packet, send a third packet to a forwarding device, where the third packet includes the identifier of the network slice and the identifier of the network slice is used to instruct the forwarding device to use a forwarding resource of the network slice to forward the third packet.

Optionally, before sending the third packet, the sending unit is further configured to send a fourth packet to the server, where the fourth packet includes location information of the terminal device and the fourth packet is used to request an IP address from the server, and the receiving unit is further configured to receive a fifth packet sent by the server after the sending unit sends the fourth packet, where the fifth packet includes the IP address and the IP address is used as a source IP address of the third packet sent by the terminal device.

According to a sixth aspect, a server is provided. The server includes a receiving unit, a determining unit, and a sending unit, where the receiving unit is configured to receive a first packet sent by a terminal device, where the first packet includes a service identifier of the terminal device, the determining unit is configured to determine an identifier of a network slice based on an entry of a mapping relationship between the network slice and the service identifier that is received by the receiving unit, and the sending unit is configured to send a second packet to the terminal device, where the second packet includes the identifier that is of the network slice and that is determined by the determining unit, the identifier of the network slice is added to a third packet by the terminal device and sent to a forwarding device, and the identifier of the network slice is used to instruct the forwarding device to use a forwarding resource of the network slice to forward the third packet.

According to a seventh aspect, a control device is provided. The control device includes a processor and a network interface and the processor is configured to perform corresponding functions in the method of the first aspect. The network interface is configured to support communication between the control device and a terminal device or a server and is configured to send or receive a packet related to the foregoing method. The control device may further include a memory. The memory is configured to be coupled with the processor and stores a program instruction and data that are used by the processor for execution.

According to an eighth aspect, a terminal device is provided. The terminal device includes a processor, a transmitter, and a receiver. The processor is configured to perform corresponding functions in the method of the second aspect. The transmitter and the receiver are configured to support communication between the terminal device and a control device or a server and are configured to send or receive a packet related to the foregoing method. The terminal device may further include a memory. The memory is configured to be coupled with the processor and stores a program instruction and data that are used by the processor for execution.

According to a ninth aspect, a server is provided. The server includes a processor and a network interface and the processor is configured to perform corresponding functions in the method of the third aspect. The network interface is configured to support communication between the server and a terminal device or a control device and is configured to send or receive a packet related to the foregoing method. The server may further include a memory. The memory is configured to be coupled with the processor and stores a program instruction and data that are used by the processor for execution.

Optionally, according to any one of the first aspect, the fourth aspect, or the seventh aspect, the first network is a transport network, and the second network is a core network.

Optionally, according to any one of the second aspect, the fifth aspect, or the eighth aspect, the identifier of the network slice is carried in a virtual local area network (VLAN) tag of the third packet.

According to a tenth aspect, a communications system is provided. The communications system includes the control device and the server in the foregoing aspects, or the server and the terminal device in the foregoing aspects, or the control device, the server, and the terminal device in the foregoing aspects.

In all of the foregoing aspects, before sending a service packet, a terminal device sends, to a server, a request packet for requesting the server to allocate an identifier of a network slice. The server allocates the identifier of the network slice to the terminal device based on a service type of the terminal device and sends the identifier of the network slice to the control device. The control device determines parameter information of the network slice based on the identifier of the network slice and determines a forwarding path based on the parameter information. Then, the control device adds a forwarding resource included in the forwarding path to a forwarding resource of the network slice. When the terminal device sends the service packet, the service packet is forwarded using the forwarding resource of the network slice. The forwarding resource of the network slice is dynamically configured and packets sent by different terminal devices are forwarded based on service requirements using forwarding resources of different network slices. Different forwarding services are provided for different services, reducing deployment costs of a forwarding device and a transmission link.

BRIEF DESCRIPTION OF DRAWINGS

To describe the technical solutions in some of the embodiments of this application more clearly, the following briefly describes the accompanying drawings describing some of the embodiments. The accompanying drawings in the following description show some embodiments of this application, and a person of ordinary skill in the art may still derive other drawings from these accompanying drawings without creative efforts.

FIG. 5 is a schematic flowchart of yet another packet processing method according to an embodiment of this application;

FIG. 6 is a schematic flowchart of yet another packet processing method according to an embodiment of this application;

DESCRIPTION OF EMBODIMENTS

Application scenarios that are described in the embodiments of this application are used to describe technical solutions in the embodiments of this application more clearly, but are not intended to limit the technical solutions provided in the embodiments of this application. A person of ordinary skill in the art may learn that with evolution of network architectures and emergence of a new service scenario, the technical solutions provided in the embodiments of this application are also applicable to a similar technical problem.

In the embodiments of this application, a "network slice" is a set of logical forwarding resources in a network. The forwarding resources are resources that need to be used in a packet forwarding process. For example, the forwarding resources include but are not limited to a resource of a forwarding device and a resource of a transmission link. For example, a storage resource of the forwarding device, a computing resource of the forwarding device, an interface of the forwarding device, and a transmission resource of the transmission link need to be used in the packet forwarding process.

In the embodiments of this application, a "node" may be a forwarding device. For example, the "node" may be a router, a switch, an optical transport network (OTN) device, a packet transport network (PTN) device, or a wavelength division multiplexing (WDM) device.

In the embodiments of this application, a "connection" relationship between devices or nodes may be replaced with a "coupling" relationship or a "communication" relationship.

In the embodiments of this application, a terminal device may be user equipment (UE). For example, the terminal device may include various handheld devices, in-vehicle devices, wearable devices, or computing devices that have a wireless communication function, or another processing device connected to a wireless modem.

Figure 1:
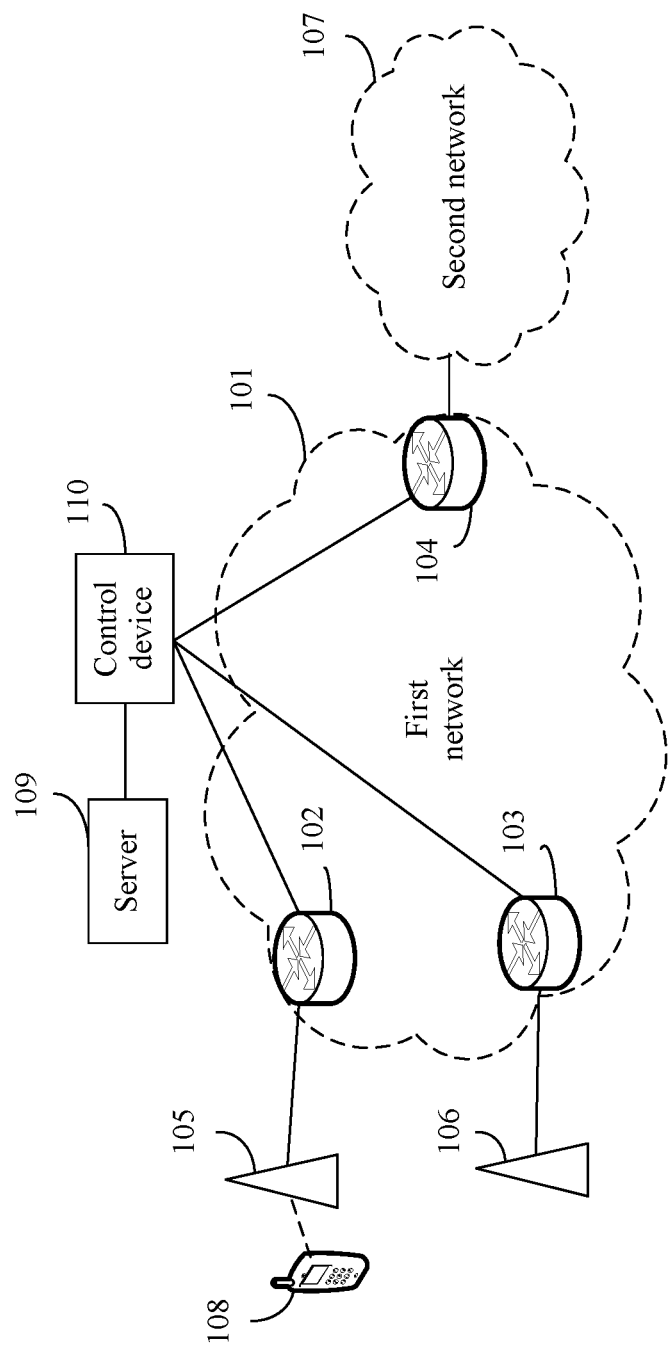
FIG. 1 is a schematic diagram of a possible application scenario according to an embodiment of this application.

FIG. 1 is a schematic diagram of an application scenario according to an embodiment of this application. A first network 101 includes a forwarding device 102, a forwarding device 103, and a forwarding device 104. The forwarding device 102 is connected to a base station 105 and the forwarding device 103 is connected to a base station 106. The forwarding device 104 is connected to a forwarding device (not shown in FIG. 1) in a second network 107. For example, the forwarding device 102, the forwarding device 103, and the forwarding device 104 are edge nodes of the first network 101.

The base station 105 and the base station 106 separately provide a wireless access service for a terminal device in an area. For example, a terminal device 108 accesses a network in an area for which the base station 105 provides a wireless access service. The terminal device 108 sends to-be-sent data to the base station 105 in a form of a radio signal, and the base station 105 converts the radio signal into a wired signal and sends the packet to the forwarding device 102 in a form of a wired signal such that the packet enters the first network 101 for transmission.

In an example, the first network 101 may be a transport network in a provider network and is used to forward data of the terminal device to the second network 107. The second network 107 is a core network in the provider network and is used to provide various services for the terminal device.

In another example, the first network 101 and the second network 107 may be two autonomous systems (AS) defined according to the Border Gateway Protocol (BGP) in the provider network.

A communications solution generally and currently used is described below using an example in which the second network 107 is a general packet radio service (GPRS) core network and the terminal device is a mobile phone. Before the terminal device accesses the Internet, the base station negotiates with a gateway of the GPRS core network using the GPRS Tunneling Protocol (GTP) to establish a GPRS tunnel in the first network 101. The terminal device 108 performs IP encapsulation on the to-be-sent data to generate a first IP data packet. Then, the terminal device successively encapsulates, according to a specification of a Long Term Evolution (LTE) radio protocol stack, a Packet Data Convergence Protocol (PDCP) header, a Radio Link Control (RLC) header, a Media Access Control (MAC) header, and a physical-layer protocol header on an outer layer of the first IP data packet to generate a second data packet and sends the second data packet to the base station in a form of a radio signal. The base station decapsulates the physical-layer protocol header, the MAC header, the RLC header, and the PDCP header to obtain the first IP data packet of the terminal device. Then, the base station successively encapsulates, based on the pre-established GPRS tunnel, a GTP header, a User Datagram Protocol (UDP) header, and an IP header on the outer layer of the first IP data packet to generate a third data packet and sends the third data packet through the tunnel to the gateway of the GPRS core network. The gateway decapsulates the IP header, the UDP header, and the GTP header of the third data packet to obtain the first IP data packet and then processes the first IP data packet.

The foregoing solution has the following problems.

First, when the base station establishes the tunnel with the GPRS gateway and implements encapsulation of the GTP header, the UDP header, and the IP header, the base station needs to have a relatively strong computing capability and data processing function, and therefore deployment costs of the base station are high. Currently, a macro base station having the computing capability cannot adapt to a requirement for extensive deployment of base stations in a 5G network environment.

Second, after the base station pre-establishes the tunnel with the GPRS gateway in the first network, a forwarding resource and a QoS class of the tunnel are determined. In the 5G network environment, QoS requirements of different terminal devices vary greatly. If different tunnels are pre-established for different services and each tunnel needs to occupy a corresponding forwarding resource, a large quantity of forwarding devices need to be deployed in the first network to meet a requirement and costs of deploying the large quantity of forwarding devices are huge.

To resolve the foregoing problem, as shown in FIG. 1, in the application scenario provided in this embodiment of this application, a server 109 and a control device 110 are further included.

The server 109 separately establishes a connection to the base station 105 and the base station 106. The server 109 is configured to obtain, based on an Internet access request of the terminal device 108, a service type of the terminal device 108, determine a corresponding network slice for the terminal device 108, and allocate an IP address and an identifier of the network slice to the terminal device 108.

The control device 110 separately establishes a connection to each forwarding device, for example, the forwarding device 102, the forwarding device 103, and the forwarding device 104, in the first network 101. The control device 110 further establishes a connection to the server 109. The server 109 determines a network slice corresponding to an Internet access service of the terminal device and sends the identifier of the network slice to the control device 110. The control device 110 deploys a transmission path for the service in the first network 101 based on the identifier that is of the network slice and that is sent by the server 109.

For example, the control device 110 may be a software-defined networking (SDN) controller. The controller 110 stores a topology of the forwarding devices in the first network 101, a forwarding resource of each forwarding device, and parameter information of each network slice. The controller 110 dynamically determines a forwarding path for the service of the terminal device based on parameter information of the network slice and adds a forwarding resource of the forwarding path to the network slice corresponding to the service such that the service of the terminal device is forwarded in the first network 101 using these forwarding resources.

For example, the server 109 and the control device 110 may be independent physical devices, or may be different software or hardware function modules on a same physical device. Certainly, alternatively, the server 109 or the control device 110 may be a cluster including a plurality of devices.

Figure 2:
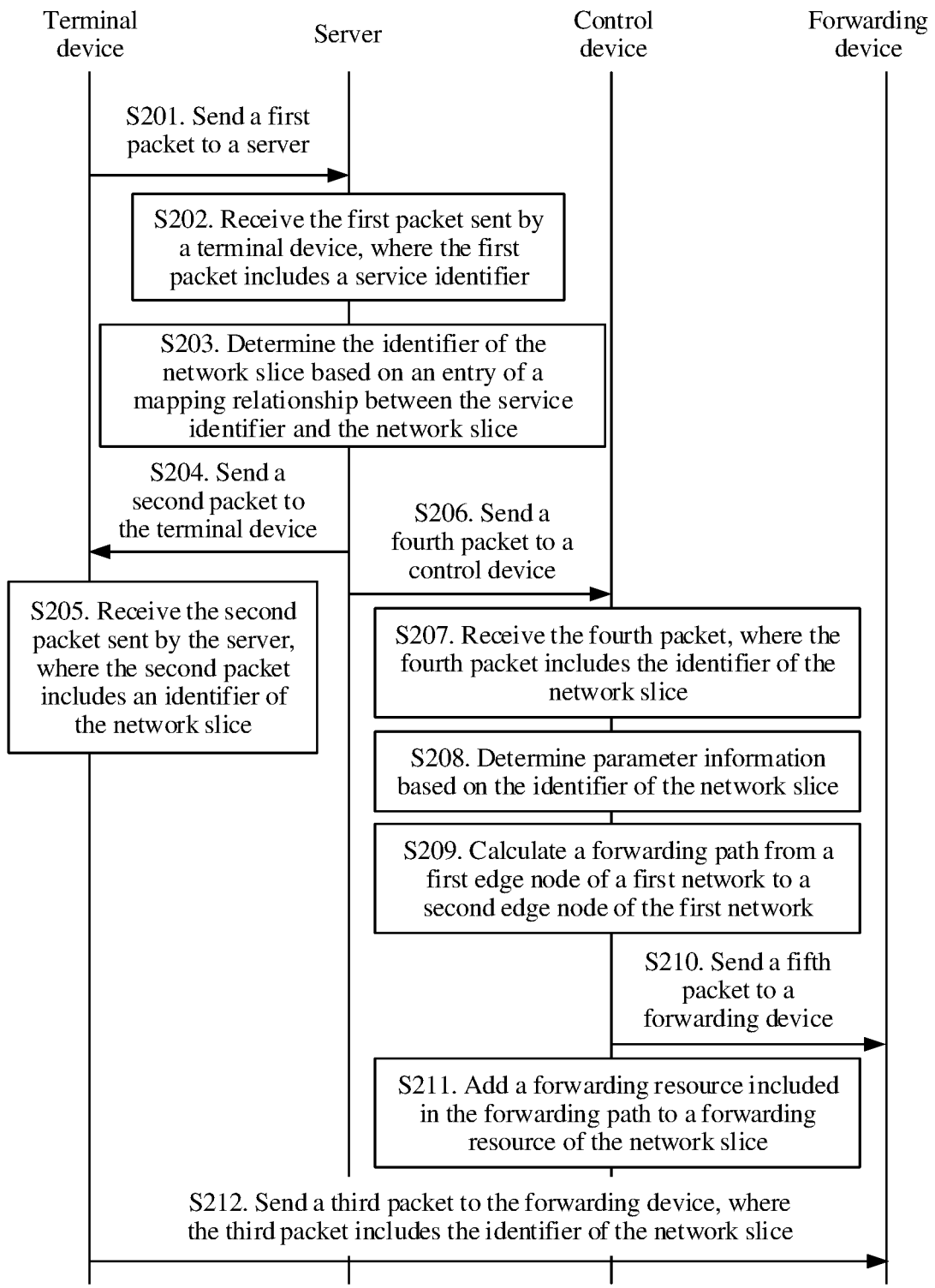
FIG. 2 is a schematic flowchart of a packet processing method according to an embodiment of this application.

FIG. 2 shows a schematic flowchart of a packet processing method according to an embodiment of this application. For example, the method may be applied to the application scenario shown in FIG. 1. A terminal device in the method shown in FIG. 2 may be the terminal device 108 shown in FIG. 1. A server in the method shown in FIG. 2 may be the server 109 shown in FIG. 1. A control device in the method shown in FIG. 2 may be the control device 110 in FIG. 1. A forwarding device in the method shown in FIG. 2 may be the forwarding device in FIG. 1. For example, the first edge node in the method in FIG. 2 may be the forwarding device 102 in FIG. 1, and the second edge node in the method in FIG. 2 may be the forwarding device 104 in FIG. 1. The method includes the following steps.

Step S201. A terminal device sends a first packet to a server, where the first packet includes a service identifier of the terminal device and the first packet is used to request, from the server, an identifier of a network slice that is corresponding to the service identifier.

Step S202. The server receives the first packet sent by the terminal device, where the first packet includes the service identifier of the terminal device.

Step S203. The server determines the identifier of the network slice based on an entry of a mapping relationship between the service identifier and the network slice.

Step S204. The server sends a second packet to the terminal device, where the second packet includes the identifier of the network slice, the identifier of the network slice is added to a third packet by the terminal device and sent to a forwarding device, and the identifier of the network slice is used to instruct the forwarding device to use a forwarding resource of the network slice to forward the third packet.

Step S205. The terminal device receives the second packet sent by the server, where the second packet includes the identifier of the network slice.

Step S206. The server sends a fourth packet to a control device.

Step S207. The control device receives the fourth packet, where the fourth packet includes the identifier of the network slice.

Step S208. The control device determines parameter information of the network slice based on the identifier of the network slice.

Step S209. The control device calculates, based on the parameter information, a forwarding path from a first edge node of a first network to a second edge node of the first network, where the first edge node is configured to send a packet sent by the terminal device to the first network and the second edge node is configured to send the packet sent by the terminal device to a second network.

Step S210. The control device sends a fifth packet to the forwarding device, where the fifth packet includes information about the forwarding path.

Step S211. The control device adds a forwarding resource included in the forwarding path to the forwarding resource of the network slice, where the forwarding path is used to forward a packet carrying the identifier of the network slice.

Step S212. The terminal device sends the third packet to the forwarding device, where the third packet includes the identifier of the network slice and the identifier of the network slice is used to instruct the forwarding device to use the forwarding resource of the network slice to forward the third packet.

For example, the first packet in steps S201 and S202 may be an Internet access request sent by the terminal device to the server before accessing the Internet. The service identifier may be carried in a payload of the first packet. For example, a type-length-value (TLV) is defined in the payload of the first packet and the Value field is used to carry a service identifier. For example, a service identifier 001 indicates a voice service, and a service identifier 002 indicates a self-driving service.

For example, in step S203, the entry of the mapping relationship between the service identifier and the network slice may be an entry pre-stored in the server. For example, the server pre-stores a mapping table of a relationship between a plurality of service identifiers and identifiers of a plurality of network slices. The server searches the mapping table for a corresponding entry using a service identifier as a keyword and determines an identifier of a network slice in the entry.

For example, the mapping relationship between the service identifier and the network slice may be defined by an operator of the first network based on a requirement. One network slice is used to forward one or more types of specific services.

In an example, a plurality of service identifiers may be corresponding to a same network slice. In the mapping relationship table that is between the service identifier and the network slice and that is stored in the server, the plurality of service identifiers is mapped to an identifier of the same network slice. For example, a plurality of services with a similar key performance indicator (KPI) is mapped to a same network slice. For example, the self-driving service and a remote surgery service have a similar bandwidth requirement and a similar ultra-low delay requirement, and therefore can be mapped to a same network slice.

In another example, a plurality of network slices may be allocated to a same service. To be specific, when the server determines an identifier of a network slice, based on a service identifier and with reference to another preset rule, the server can determine, from the mapping relationship table, the identifier of the network slice corresponding to the service identifier included in the first packet. A manner in which a service type and a network slice are mapped is not limited in this embodiment of this application.

For example, after the server determines an identifier of a network slice in step S203, the server writes the identifier of the network slice to the second packet and sends the second packet to the terminal device in step S204, and writes the identifier of the network slice to the fourth packet and sends the fourth packet to the control device in step S206. It should be noted that a sequence of performing steps S204 and S206 is not limited in this embodiment of this application.

Optionally, in an example, the server first performs step S206 and sends the identifier of the network slice to the control device. The control device performs steps S207 to S211 based on the identifier of the network slice and then sends a response packet to notify the server. Then, the server performs step S204. This can avoid a case in which the forwarding path in step S209 is still not determined when step S212 of sending the third packet to the forwarding device is immediately performed after the terminal device receives the identifier of the network slice in step S205. Certainly, if the control device performs steps S207 to S211 at a relatively high speed, there is no need to use the foregoing limitation on the sequence of the steps.

Optionally, in another example, step S204 may alternatively be performed by the control device. For example, after performing step S211, the control device sends the second packet to the terminal device based on an identifier of the terminal device. The second packet includes the identifier of the network slice, the identifier of the network slice is added to the third packet by the terminal device and sent to the first edge node in step S209, and the identifier of the network slice is used to instruct the first edge node to use the forwarding resource of the network slice to forward the third packet. In this example, the control device may obtain an address of the terminal device based on the identifier of the terminal device and sends the second packet to the terminal device. Certainly, alternatively, the identifier of the terminal device may be the address of the terminal device.

A person skilled in the art may understand that because a communication protocol used by the terminal device may be different from a communication protocol used by the control device, a specific format of the identifier of the network slice included in the second packet in step S204 may be different from a specific format of the identifier of the network slice included in the fourth packet in step S206. However, both the identifier of the network slice in the second packet and the identifier of the network slice in the fourth packet are used to identify a same network slice. Likewise, the identifier of the network slice included in the fifth packet in step S210 and the identifiers of network slices in the second packet and the fourth packet are also used to identify a same network slice. However, a specific format may be the same as the format in the second packet or the fourth packet, or may be different from the format in the second packet or the fourth packet.

For example, in step S208, that the control device determines the parameter information of the network slice based on the identifier of the network slice may be as follows. The control device pre-stores identifiers of a plurality of network slices and parameter information of a network slice corresponding to each identifier, and the control device determines, based on stored content, the parameter information corresponding to the network slice identified by the identifier of the network slice in the fourth packet.

For example, the forwarding path that is calculated by the control device in S209 and that is from the first edge node of the first network to the second edge node of the first network is a forwarding path determined based on the parameter information that is of the network slice and that is determined in step S208.

For example, the parameter information of the network slice includes information such as a bandwidth, a delay requirement, and a packet loss rate requirement and the information may be represented in a form of QoS information. A QoS parameter of the network slice defines QoS that is of a service transmitted in a network using a forwarding resource of the network slice and that needs to be guaranteed, for example, a bandwidth, a packet loss rate, and a delay that are of the service transmitted in the network using the forwarding resource of the network slice and that need to be guaranteed. For example, the first network includes a first network slice and a second network slice. The first network slice is used to forward a video service, and QoS information of the first network slice is as follows. A service transmission bandwidth is 8 gigabits per second (Gbit/s) and a transmission delay is less than 10 milliseconds (ms). The second network slice is used to forward a remote machine operation control signal, and QoS information of the second network slice is as follows. A service transmission bandwidth is 100 megabits per second (Mbit/s) and a transmission delay is less than 1 ms. For example, if the identifier of the network slice in the fourth packet identifies the first network slice, when the control device calculates the forwarding path in step S209, it needs to be ensured that the forwarding path meets a requirement of the QoS information of the first network slice.

For example, the first edge node and the second edge node may be determined based on the parameter information determined in step S208 and/or related information of the terminal device.

In an example, the fourth packet further includes location information of the terminal device and the control device determines the first edge node based on the location information. For example, a network architecture is shown in FIG. 1. The first network 101 is a transport network and the second network 107 is a core network. The control device 110 determines, based on location information of the terminal device 108, that the terminal device 108 accesses a network using the base station 105, the base station 105 sends a packet to the forwarding device 102 in the first network 101, and the packet is forwarded in the first network 101 such that the control device 110 determines that the first edge node is the forwarding device 102. In a possible example, the location information may be Global Positioning System (GPS) information of the terminal device. The control device determines, based on the GPS information of the terminal device, that the terminal device accesses the network using the base station. In another possible example, the location information is an IP address allocated by the server to the terminal device using the method in FIG. 3. In the method in FIG. 3, the IP address is allocated based on a location of the terminal device. Therefore, the control device may determine, based on the IP address, for example, a subnet segment of the IP address, a specific edge forwarding device used to forward the packet of the terminal device to the first network.

In another example, the parameter information includes an identifier of the second edge node and the control device determines the second edge node based on the parameter information. Still in the example in which the first network 101 is a transport network and the second network 107 is a core network in FIG. 1, the first network 101 needs to forward different service packets to gateways of different core networks. The parameter information of the network slice in step S208 includes an address of a gateway of a core network to which a service needs to be sent, where the service is forwarded using the network slice. In step S209, the control device 110 determines, based on a related forwarding entry, that the forwarding device 104 in the first network 101 may send the packet to the gateway of the core network such that the control device 110 determines that the forwarding device 104 is the second edge node.

Certainly, a person skilled in the art may understand that the first network may alternatively be an AS in a provider network. In this example, a manner in which the first edge node and the second edge node are determined is similar to that in the example of the transport network. Details are not described again.

In an example, the forwarding path calculated in step S209 may be a new forwarding path. For example, some or all forwarding devices and some or all transmission links in the forwarding path are not used to forward the packet of the network slice before step S209.

In another example, the forwarding path calculated in step S209 may be a forwarding path that has been used to forward the packet of the network slice before step S209. After calculating the forwarding path in step S209, the control device increases a bandwidth of the forwarding path based on the fourth packet. For example, the first network slice is used to transmit a video service. A forwarding path from the forwarding device 102 to the forwarding device 104 exists in the first network in FIG. 1, a forwarding resource of the forwarding path is included in the first network slice, and three video service terminal devices may access the Internet through the forwarding path. Then, another new terminal device 108 sends an Internet access request. In step S209, it is determined that a service of the terminal device is still forwarded through a same forwarding path and a bandwidth resource of the forwarding path may be increased such that four video service terminal devices may access the Internet through the forwarding path.

For example, the control device stores a forwarding resource included in each network slice. The forwarding resource of the network slice includes but is not limited to a forwarding device and a transmission link that are used to forward the network slice. A forwarding resource of a forwarding device may be simultaneously used by different network slices. For example, an interface of the forwarding device can provide a bandwidth of 10 Gbit/s, and the interface may provide a bandwidth of 3 Gbit/s for the first network slice, provide a bandwidth of 7 Gbit/s for the second network slice, and provide a corresponding guarantee for features such as a delay and a packet loss rate of the two network slices using a traffic scheduling mechanism of the forwarding device. Therefore, the forwarding resource included in the network slice may further include interfaces included by the forwarding device used to forward the network slice and bandwidths included by each interface to forward the packet of the network slice.

For example, a forwarding resource included in a network slice is dynamically configured by the control device based on a service forwarding requirement of the terminal device. For example, when the terminal device sends an Internet access request, the control device establishes, based on a network slice corresponding to a type of a service that is to be sent by the terminal device, a forwarding path needed when the terminal device sends the service and adds a forwarding resource of the forwarding path to the network slice. The control device centrally manages forwarding resources in a same network slice and separately manages forwarding resources of different network slices. If the terminal device sends a request for ending the service or leaves an area of an ingress node of the forwarding path, the control device deletes the forwarding resource of the forwarding path from the network slice such that the forwarding resource of the forwarding path may be used to transmit a service of another network slice.

In an example, the forwarding device in step S210 may be any forwarding device on the forwarding path in step S209. The control device sends the information about the forwarding path to each forwarding device on the forwarding path. For example, information that is about the forwarding path and that is sent by the control device to the first edge node may include the identifier of the network slice, an identifier of the forwarding path, and a next-hop node of the first edge node. For another node other than the first edge node on the forwarding path, information that is about the forwarding path and that is sent by the control device to the other node may include a previous-hop node and a next-hop node of the other node on the forwarding path and the identifier of the forwarding path.

In another example, the forwarding device in step S210 may be the first edge node and/or the second edge node. For example, the control device only sends the information about the forwarding path to the first edge node and/or the second edge node. The forwarding path is established based on the information about the forwarding path using the first edge node and/or the second edge node. In this example, the forwarding information may include the identifier of the network slice and information about a forwarding resource that is required for establishing the forwarding path. For example, the forwarding information may include the identifier of the network slice and information required by a path computation client (PCC) in the Path Computation Element Protocol (PCEP).

For example, in step S211, that the control device adds a forwarding resource included in the forwarding path to the forwarding resource of the network slice may include updating the forwarding resource that is included in the network slice and that is stored in the control device such that a set of forwarding resources of the network slice after updating includes the forwarding resource of the forwarding path. As mentioned in step S204 and step S212, that the forwarding device uses the forwarding resource of the network slice to forward the third packet may be that the forwarding device uses the forwarding resource included in the set of forwarding resources of the network slice after updating in step S211 to forward the third packet.

For example, in step S212, the terminal device may add the identifier that is of the network slice and that is received in step S205 to the third packet. For example, the third packet is sent from the first edge node to the first network. The first edge node uses, based on the identifier of the network slice in the third packet, the forwarding resource of the network slice, for example, the forwarding path calculated in step S209 to forward the third packet. The third packet may be a service packet and the service may be a service identified by the service identifier included in the first packet in step S201. Optionally, the identifier of the network slice is carried in a VLAN tag of the third packet.

In the foregoing solution, before sending a service packet, the terminal device requests the server to allocate, based on a service type, an identifier of a network slice to the terminal device and adds the identifier of the network slice to the service packet such that the packet is forwarded using a forwarding resource of the network slice. A forwarding path in the network slice is configured based on a feature required by the service. Therefore, a network can provide different services for services of different terminal devices, improving network flexibility and forwarding quality.

In addition, in the foregoing solution, after the control device receives a service sending request generated by the terminal device, the server allocates a network slice to the terminal device, and the control device dynamically establishes a forwarding path that meets parameter information of the network slice such that the control device may dynamically determine a forwarding resource for the network slice based on a service requirement in a network. In this way, a forwarding resource in the network may be used to forward packets of different network slices based on requirements in different time periods. When a forwarding requirement of a network slice changes, the control device can quickly adjust a forwarding resource of the network slice such that the forwarding resource in the network can be fully used, saving the forwarding resource.

In addition, when parameter information of the network slice changes, the control device may adjust the forwarding resource in the network slice accordingly in a timely manner based on a change of the parameter information, improving network flexibility.

Figure 3:
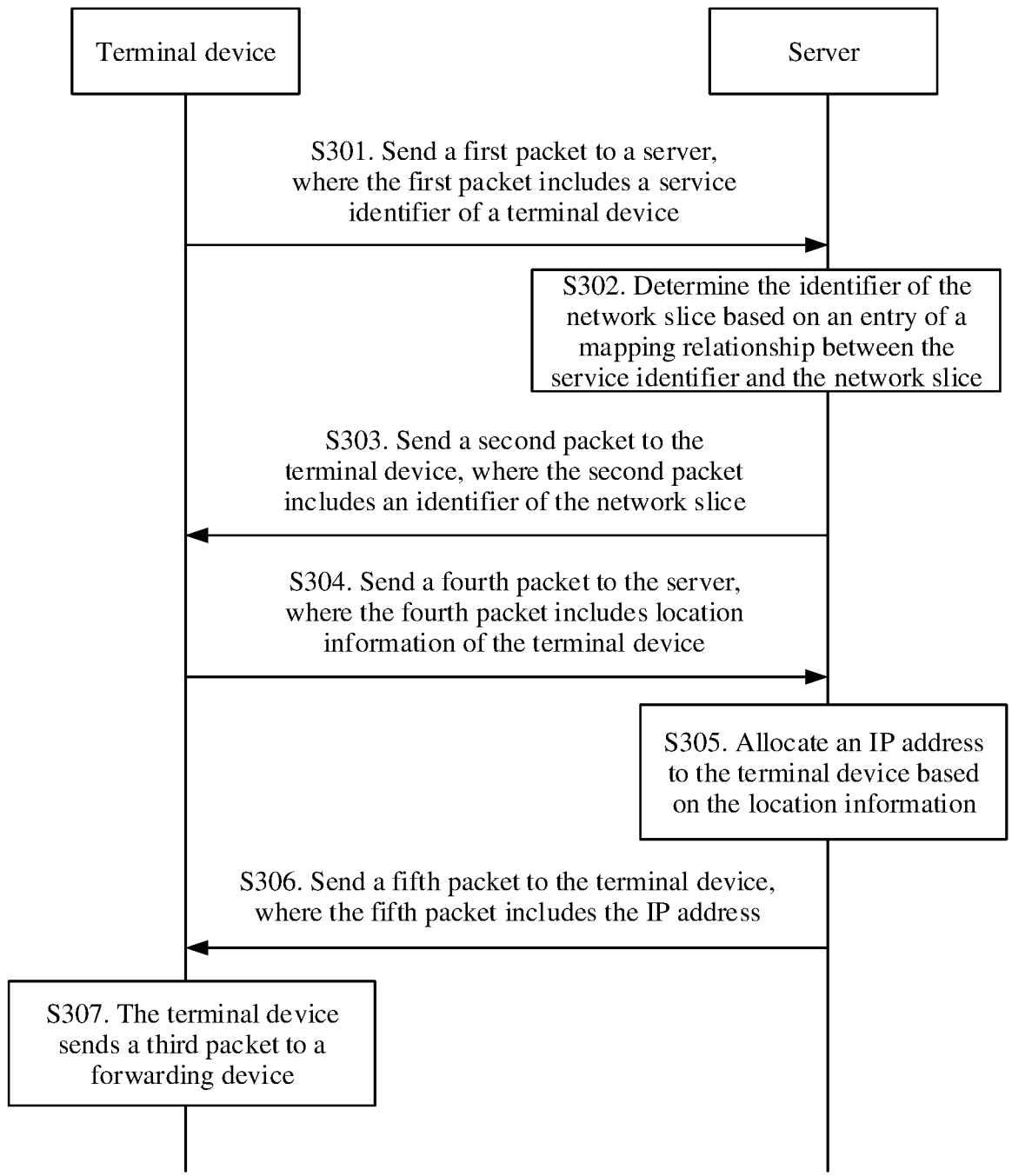
FIG. 3 is a schematic flowchart of another packet processing method according to an embodiment of this application.

FIG. 3 shows a flowchart of a packet processing method according to an embodiment of this application. For example, the method may be applied to the application scenario shown in FIG. 1. A terminal device in the method in FIG. 3 may be the terminal device 108 shown in FIG. 1. A server shown in FIG. 3 may be the server 109 shown in FIG. 1. The method includes the following steps.

Step S301. A terminal device sends a first packet to a server, where the first packet includes a service identifier of the terminal device and the first packet is used to request, from the server, an identifier of a network slice that is corresponding to the service identifier.

Correspondingly, the server receives the first packet from the terminal device.

For example, a specific implementation of step S301 is the same as the implementation of step S201 shown in FIG. 2.

Step S302. The server determines the identifier of the network slice based on an entry of a mapping relationship between the service identifier and the network slice.

For example, a specific implementation of step S302 is the same as the implementation of step S203 shown in FIG. 2.

Step S303. The server sends a second packet to the terminal device, where the second packet includes the identifier of the network slice, the identifier of the network slice is added to a third packet by the terminal device and sent to a forwarding device, and the identifier of the network slice is used to instruct the forwarding device to use a forwarding resource of the network slice to forward the third packet.

Correspondingly, the terminal device receives the second packet.

For example, a specific implementation of step S303 is the same as the implementation of step S204 shown in FIG. 2.

Step S304. The terminal device sends a fourth packet to the server, where the fourth packet includes location information of the terminal device and the fourth packet is used to request an IP address from the server.

Correspondingly, the server receives the fourth packet.

For example, the location information may be GPS information.

For example, the fourth packet and the first packet in step S301 may be a same packet, or may be different packets.

Step S305. The server allocates the IP address to the terminal device based on the location information, where the IP address is used as a source IP address of the third packet sent by the terminal device.

Further, the IP address is allocated by the server based on the location information of the terminal device. For example, the server 109 shown in FIG. 1 stores the following information A terminal device located in a first area accesses a network using one or more base stations including the base station 105, the one or more base stations in the first area communicate with the forwarding device 102 in the first network, and a first IP subnet segment corresponds to the forwarding device 102. The server 109 further stores the following information A terminal device located in a second area accesses the network using one or more base stations including the base station 106, the one or more base stations in the second area communicate with the forwarding device 103 in the first network, and a second IP subnet segment corresponds to the forwarding device 103. The server 109 determines, based on the location information in the first packet, that a location of the terminal device 108 is in the first area and therefore determines, from the first IP subnet segment, that the IP address is a source IP address of the terminal device.

Step S306. The server sends a fifth packet to the terminal device, where the fifth packet includes the IP address.

Correspondingly, the terminal device receives the fifth packet.

For example, the fifth packet and the second packet in step S303 may be a same packet, or may be different packets.

Step S307. The terminal device sends the third packet to the forwarding device, where the third packet includes the identifier of the network slice and the identifier of the network slice is used to instruct the forwarding device to use the forwarding resource of the network slice to forward the third packet. The source IP address of the third packet is the IP address.

For example, in step S307, an implementation of another part other than the source IP address of the third packet is the same as step S212 in FIG. 2.

The application scenario in FIG. 1 is still used as an example. It is assumed that when sending the third packet, the terminal device 108 still accesses the network using the base station 105, or still accesses the network using another base station that communicates with the forwarding device 102. When sending the third packet, the terminal device uses the IP address allocated by the server and received in step S306 as the source IP address of the third packet.

In this way, when a remote device sends a response packet for the third packet to the terminal device 108 and the response packet is sent using a gateway of a core network to the first network 101, a forwarding device in the first network 101 may forward the response packet to the forwarding device 102 based on a forwarding table and the forwarding device 102 sends the response packet to the base station 105 or the other base station that communicates with the forwarding device 102 such that the response packet is sent to the terminal device 108. Optionally, when the gateway of the core network sends a return packet to the terminal device 108, the return packet is also sent to the forwarding device 102 using the forwarding resource of the network slice.

In the foregoing solution, the base station 105 does not need to pre-establish a GPRS tunnel with the gateway in the core network and perform GTP encapsulation and IP encapsulation on data sent by the terminal device 108 before forwarding is performed. Instead, the base station 105 may only convert the third packet sent by the terminal device 108 from a form of a radio signal to a form of a wired signal and perform physical layer encapsulation and data link layer encapsulation, and then can send the third packet to the forwarding device in the first network. Therefore, the foregoing solution greatly reduces a requirement of a computing capability required by the base station 105 and reduces costs of each base station such that a low-cost micro base station may be deployed.

Certainly, a person skilled in the art may understand that a solution in which the source IP address is allocated based on the location information of the terminal device in steps S304 and S305 may be implemented by another device and a terminal device. The terminal device may not have a function of sending the service identifier in step S301 and the other device may not have a function of determining the network slice but only has a function of allocating a source IP address based on the location information. In this example, a function of the source IP address is the same as that of the source IP address of the third packet in step S307.

Figure 4:
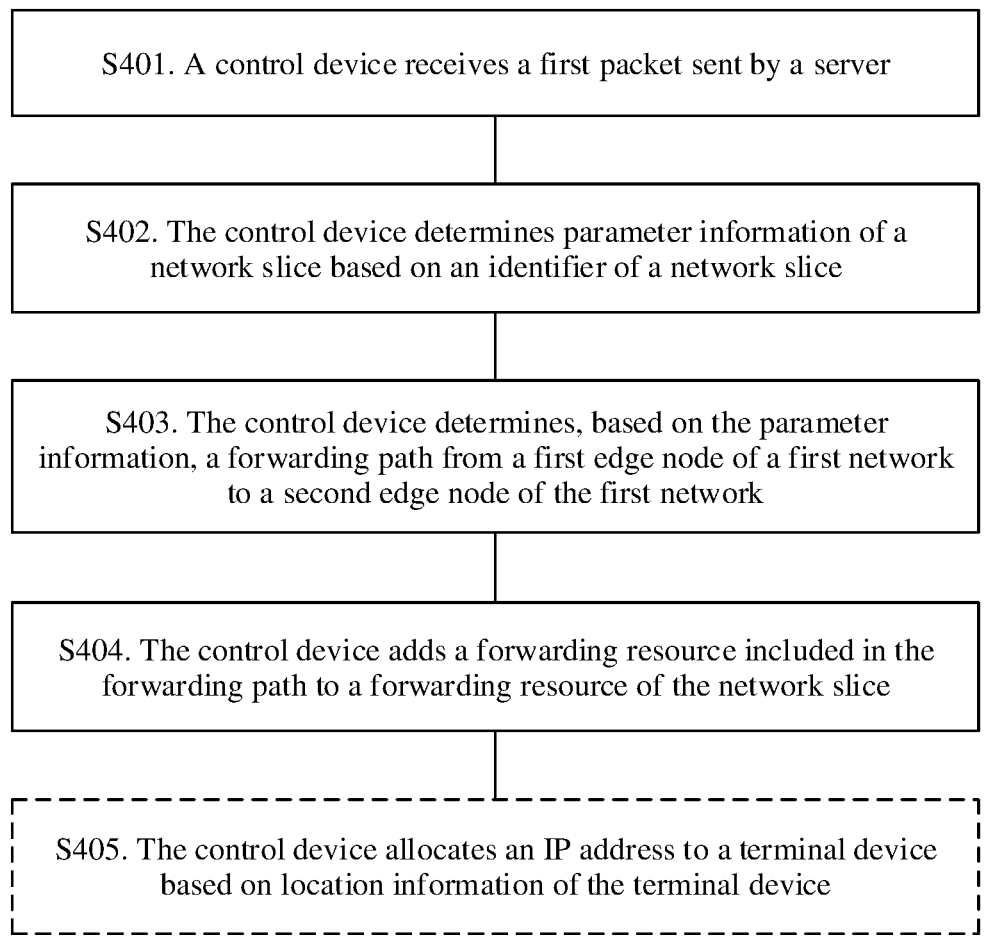
FIG. 4 is a schematic flowchart of still another packet processing method according to an embodiment of this application.

FIG. 4 shows a flowchart of still another packet processing method according to an embodiment of this application. For example, the method may be applied to the application scenario shown in FIG. 1. A terminal device in the method in FIG. 4 may be the terminal device 108 shown in FIG. 1. A control device shown in FIG. 4 may be the control device 110 shown in FIG. 1. A server in the method in FIG. 4 may be the server 109 shown in FIG. 1. The method includes the following steps.

Step S401. A control device receives a first packet sent by a server, where the first packet includes an identifier of a network slice and the identifier of the network slice is used to identify the network slice.

For example, an implementation of step S401 is the same as that of step S207 shown in FIG. 2. The first packet in step S401 may be the fourth packet in step S207.

Step S402. The control device determines parameter information of the network slice based on the identifier of the network slice.

For example, an implementation of step S402 is the same as that of step S208 shown in FIG. 2.

Step S403. The control device determines, based on the parameter information, a forwarding path from a first edge node of a first network to a second edge node of the first network, where the first edge node is configured to send a packet sent by the terminal device to the first network and the second edge node is configured to send the packet sent by the terminal device to a second network.

For example, an implementation of step S403 is the same as that of step S209 and that of step S210 shown in FIG. 2. For example, that the control device determines the forwarding path in step S403 may include calculating, by the control device, the forwarding path and sending information about the forwarding path to the forwarding device.

Optionally, the parameter information includes a QoS parameter and correspondingly, the control device determines the forwarding path based on the QoS parameter.

Optionally, the first packet further includes location information of the terminal device and before the control device performs step S403, the method includes determining, by the control device, the first edge node based on the location information.

For example, a network architecture is shown in FIG. 1. The first network 101 is a transport network and the second network 107 is a core network. The control device 110 determines, based on location information of the terminal device 108, that the terminal device 108 accesses a network using the base station 105, the base station 105 sends a packet to the forwarding device 102 in the first network 101, and the packet is forwarded in the first network 101 such that the control device 110 determines that the first edge node is the forwarding device 102. In a possible example, the location information may be GPS information of the terminal device. The control device determines, based on the GPS information of the terminal device, that the terminal device accesses the network using the base station. In another possible example, the location information is an IP address allocated by the server to the terminal device using the method in FIG. 3. In the method in FIG. 3, the IP address is allocated based on a location of the terminal device. Therefore, the control device may determine, based on the IP address, for example, a subnet segment of the IP address, a specific edge forwarding device used to forward the packet of the terminal device to the first network.

Optionally, the parameter information includes an identifier of the second edge node and before the control device performs step S403, the method includes determining, by the control device, the second edge node based on the parameter information.

For example, still in the example in which the first network 101 is a transport network and the second network 107 is a core network in FIG. 1, the first network 101 needs to forward different service packets to gateways of different core networks. The parameter information of the network slice in step S208 includes an address of a gateway of a core network to which a service needs to be sent, where the service is forwarded using the network slice. In step S209, the control device 110 determines, based on a related forwarding entry, that the forwarding device 104 in the first network 101 may send the packet to the gateway of the core network such that the control device 110 determines that the forwarding device 104 is the second edge node.

Step S404. The control device adds a forwarding resource included in the forwarding path to a forwarding resource of the network slice, where the forwarding path is used to forward a packet carrying the identifier of the network slice.

An implementation of step S404 is the same as that of step S211 shown in FIG. 2.

Optionally, the method further includes the following step.

Step S405. The control device allocates an IP address to the terminal device based on the location information, where the IP address is used as a source IP address of the third packet sent by the terminal device.

For example, the method of allocating the IP address to the terminal device in step S405 may be the same as that in step S305 in FIG. 3. Certainly, the method further includes sending, by the control device, the IP address to the terminal device. Further, in step S305 of FIG. 3 or step S405 of FIG. 4, a step of allocating the source IP address to the terminal device based on the location information of the terminal device may be implemented by the server 109 shown in FIG. 1, or may be implemented by the control device 110 shown FIG. 1. In step S405, the location information of the first packet may be received by the server 109 from the terminal device 108 and is sent to the control device 110, or may be received by the control device 110 from the terminal device 108.

Optionally, the method further includes sending, by the control device, a second packet to the terminal device based on an identifier of the terminal device, where the second packet includes the identifier of the network slice, the identifier of the network slice is added to a third packet by the terminal device and sent to the first edge node, and the identifier of the network slice is used to instruct the first edge node to use the forwarding resource of the network slice to forward the third packet.

In the foregoing solution, the control device dynamically establishes, based on an identifier that is of a network slice and that is sent by the server, a forwarding path that meets parameter information of the network slice such that the control device may dynamically determine a forwarding resource for the network slice based on a service requirement in a network. In this way, a forwarding resource in the network may be used to forward packets of different network slices based on requirements in different time periods. When a forwarding requirement of a network slice changes, the control device can quickly adjust a forwarding resource of the network slice such that the forwarding resource in the network can be fully used, saving the forwarding resource. In addition, when parameter information of the network slice changes, the control device may adjust the forwarding resource in the network slice accordingly in a timely manner based on a change of the parameter information, improving network flexibility.

FIG. 5 shows a flowchart of yet another packet processing method according to an embodiment of this application. For example, the method may be applied to the application scenario shown in FIG. 1. A terminal device in the method in FIG. 5 may be the terminal device 108 shown in FIG. 1. A control device shown in FIG. 5 may be the control device 110 shown in FIG. 1. A server in the method in FIG. 5 may be the server 109 shown in FIG. 1. The method includes the following steps.

Step S501. A terminal device sends a first packet to a server, where the first packet includes a service identifier of the terminal device and the first packet is used to request, from the server, an identifier of a network slice that is corresponding to the service identifier.

For example, a specific implementation of step S501 may be the same as that of step S201 shown in FIG. 2.

Step S502. The terminal device receives a second packet sent by the server, where the second packet includes the identifier of the network slice.

For example, a specific implementation of step S502 may be the same as that of step S204 shown in FIG. 2.

Step S503. The terminal device sends a third packet to a forwarding device, where the third packet includes the identifier of the network slice and the identifier of the network slice is used to instruct the forwarding device to use a forwarding resource of the network slice to forward the third packet.

For example, a specific implementation of step S503 may be the same as that of step S212 shown in FIG. 2.

Optionally, the identifier of the network slice is carried in a VLAN tag of the third packet.

Optionally, the method shown in FIG. 5 further includes steps S504 and S505.

Step S504. The terminal device sends a fourth packet to the server, where the fourth packet includes location information of the terminal device and the fourth packet is used to request an IP address from the server.

For example, a specific implementation of step S504 may be the same as that of step S304 shown in FIG. 3.

Step S505. The terminal device receives a fifth packet sent by the server, where the fifth packet includes the IP address and the IP address is used as a source IP address of the third packet sent by the terminal device.

For example, a specific implementation of step S505 may be the same as that of step S306 shown in FIG. 3.

In the foregoing solution, before sending a service, the terminal device requests the server to allocate, based on a service type, an identifier of a network slice to the terminal device and adds the identifier of the network slice to the packet such that the packet is forwarded using a forwarding resource of the network slice. A forwarding path in the network slice is configured based on a feature required by a service that is to be sent by the terminal device. Therefore, a network can provide different services for services of different terminal devices, improving network flexibility and forwarding quality.

FIG. 6 is a flowchart of still yet another packet processing method according to an embodiment of this application. For example, the method may be applied to the application scenario shown in FIG. 1. A terminal device in the method in FIG. 6 may be the terminal device 108 shown in FIG. 1. A control device shown in FIG. 6 may be the control device 110 shown in FIG. 1. A server in the method in FIG. 6 may be the server 109 shown in FIG. 1. The method includes the following steps.

Step S601. A server receives a first packet sent by the terminal device, where the first packet includes a service identifier of the terminal device.

For example, a specific implementation of step S601 may be the same as that of step S202 shown in FIG. 2.

Step S602. The server determines an identifier of a network slice based on an entry of a mapping relationship between the service identifier and the network slice.

For example, a specific implementation of step S602 may be the same as that of step S203 shown in FIG. 2.

Step S603. The server sends a second packet to the terminal device, where the second packet includes the identifier of the network slice, the identifier of the network slice is added to a third packet by the terminal device and sent to a forwarding device, and the identifier of the network slice is used to instruct the forwarding device to use a forwarding resource of the network slice to forward the third packet.

For example, a specific implementation of step S603 may be the same as that of step S204 shown in FIG. 2.

Optionally, the first packet further includes location information of the terminal device and the method shown in FIG. 6 further includes step S604.

Step S604. The server allocates an IP address to the terminal device based on the location information, where the IP address is used as a source IP address of the third packet sent by the terminal device.

For example, a specific implementation of step S604 may be the same as that of step S305 shown in FIG. 3.

In the foregoing solution, the server allocates an identifier of a corresponding network slice to the terminal device based on a service requirement of the terminal device such that a service sent by the terminal device is forwarded using a forwarding resource of the network slice. A forwarding path in the network slice is configured based on a feature required by a service that is to be sent by the terminal device. Therefore, a network can provide different services for services of different terminal devices, improving network flexibility and forwarding quality.

Figure 7:
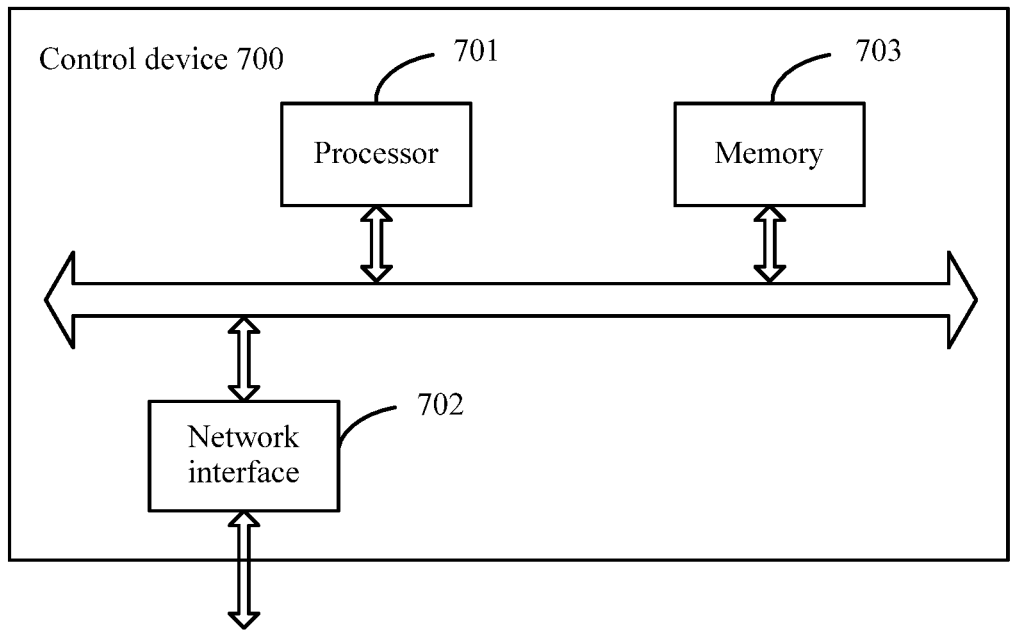
FIG. 7 is a schematic structural diagram of a control device according to an embodiment of this application.

FIG. 7 is a schematic structural diagram of a control device 700 according to an embodiment of this application. The control device 700 provided in this embodiment may be applied to the methods of the embodiments in FIG. 2 and FIG. 4, to implement functions of the control device.

As shown in FIG. 7, the control device 700 includes a processor 701 and a network interface 702. Optionally, the control device 700 further includes a memory 703.

The processor 701 includes but is not limited to one or more of a central processing unit (CPU), a network processor (NP), an application-specific integrated circuit (ASIC), and a programmable logic device (PLD). The foregoing PLD may be a complex programmable logical device (CPLD), a field programmable gate array (FPGA), generic array logic (GAL), or any combination thereof.

The network interface 702 may be a wired interface, for example, a fiber distributed data interface (FDDI) or an Ethernet interface. Alternatively, the network interface 702 may be a wireless interface, for example, a wireless local area network interface.

The memory 703 may include but is not limited to a content-addressable memory (CAM), such as a ternary CAM (TCAM) or a random access memory (RAM).

Alternatively, the memory 703 may be integrated into the processor 701. If the memory 703 and the processor 701 are mutually independent devices, the memory 703 is connected to the processor 701. For example, the memory 703 and the processor 701 may communicate with each other using a bus. The network interface 702 and the processor 701 may communicate with each other using the bus and the network interface 702 may be directly connected to the processor 701.

The processor 701 is configured to receive, using the network interface 702, a first packet sent by a server, where the first packet includes an identifier of a network slice and the identifier of the network slice is used to identify the network slice, determine parameter information of the network slice based on the identifier of the network slice, determine, based on the parameter information, a forwarding path from a first edge node of a first network to a second edge node of the first network, where the first edge node is configured to send a packet sent by the terminal device to the first network and the second edge node is configured to send the packet sent by the terminal device to a second network, and add a forwarding resource included in the forwarding path to a forwarding resource of the network slice, where the forwarding path is used to forward a packet carrying the identifier of the network slice.

For another additional function that may be implemented by the control device 700 and a process in which the control device 700 interacts with another device, refer to the description of the control device in the method embodiment. Details are not described herein again.

Figure 8:
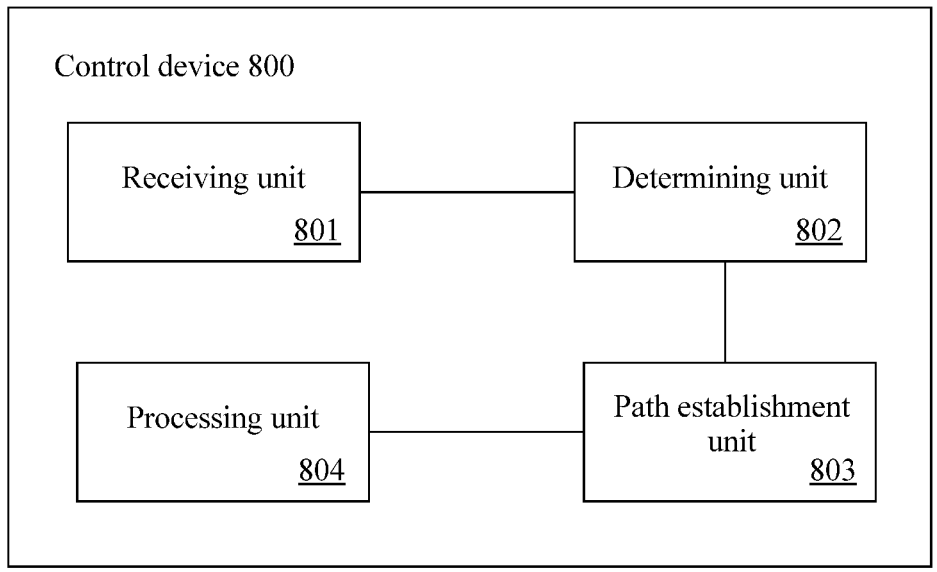
FIG. 8 is a schematic structural diagram of another control device according to an embodiment of this application.

FIG. 8 is a schematic structural diagram of a control device 800 according to an embodiment of this application. The control device 800 provided in this embodiment may be applied to the methods of the embodiments in FIG. 2 and FIG. 4, to implement functions of the control device.

As shown in FIG. 8, the control device 800 includes a receiving unit 801, a determining unit 802, a path establishment unit 803, and a processing unit 804.

The receiving unit 801 is configured to receive a first packet sent by a server, where the first packet includes an identifier of a network slice and the identifier of the network slice is used to identify the network slice.

The determining unit 802 is configured to determine parameter information of the network slice based on the identifier of the network slice in the first packet received by the receiving unit 801.

The path establishment unit 803 is configured to determine, based on the parameter information determined by the determining unit 802, a forwarding path from a first edge node of a first network to a second edge node of the first network, where the first edge node is configured to send a packet sent by the terminal device to the first network and the second edge node is configured to send the packet sent by the terminal device to a second network.

The processing unit 804 is configured to add a forwarding resource included in the forwarding path determined by the path establishment unit 803 to a forwarding resource of the network slice, where the forwarding path is used to forward a packet carrying the identifier of the network slice.

Optionally, the first packet further includes an identifier of the terminal device, the control device 800 further includes a sending unit (not shown in FIG. 8), and the sending unit is configured to send a second packet to the terminal device based on the identifier of the terminal device that is received by the receiving unit 801, where the second packet includes the identifier of the network slice, the identifier of the network slice is added to a third packet by the terminal device and sent to the first edge node, and the identifier of the network slice is used to instruct the first edge node to use the forwarding resource of the network slice to forward the third packet.

Optionally, the first packet further includes location information of the terminal device and the path establishment unit 803 is further configured to, before determining the forwarding path from the first edge node of the first network to the second edge node of the first network, determine the first edge node based on the location information.

Optionally, the determining unit 802 is further configured to allocate an IP address to the terminal device based on the location information in the first packet, where the IP address is used as a source IP address of the third packet sent by the terminal device.

Optionally, the parameter information includes an identifier of the second edge node and the path establishment unit 803 is further configured to, before determining the forwarding path from the first edge node of the first network to the second edge node of the first network, determine the second edge node based on the parameter information.

For example, the control device 800 shown in FIG. 8 may be the control device 700 shown in FIG. 7. The receiving unit 801 may be the network interface 702. The determining unit 802, the path establishment unit 803, and the processing unit 804 may be the processor 701.

For another additional function that may be implemented by the control device 800 and a process in which the control device 800 interacts with another device, refer to the description of the control device in the method embodiment. Details are not described herein again.

Figure 9:
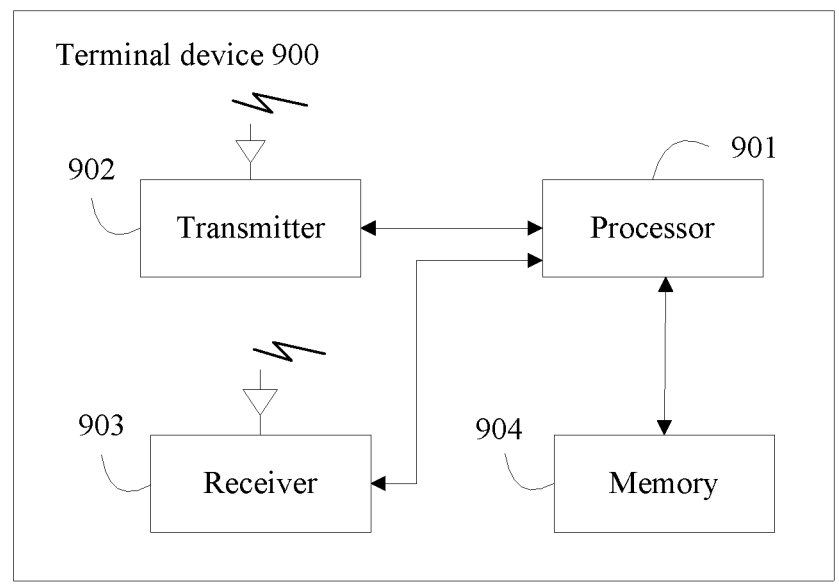
FIG. 9 is a schematic structural diagram of a terminal device according to an embodiment of this application.

FIG. 9 is a schematic structural diagram of a terminal device 900 according to an embodiment of this application. The terminal device 900 provided in this embodiment may be applied to the methods of the embodiments in FIG. 2, FIG. 3, and FIG. 5, to implement functions of the terminal device.

As shown in FIG. 9, the terminal device 900 includes a processor 901, a transmitter 902, and a receiver 903. Optionally, the terminal device 900 further includes a memory 904.

The processor 901 includes but is not limited to one or more of a CPU, an NP, an ASIC, and a PLD. The foregoing PLD may be a CPLD, an FPGA, GAL, or any combination thereof.

The transmitter 902 may be a wireless interface. For example, the transmitter adjusts (for example, through analog conversion, filtering, amplification, and up-conversion) the output sample and generates an uplink signal and the uplink signal is transmitted using an antenna.

The receiver 903 may be a wireless interface. For example, in a downlink, the receiver adjusts (for example, through filtering, amplification, down-conversion, and digitization) a signal received from the antenna.

The memory 904 may include but is not limited to a CAM, for example, a TCAM or a RAM.

The processor 901 is configured to send a first packet to a server using the transmitter 902, where the first packet includes a service identifier of the terminal device and the first packet is used to request, from the server, an identifier of a network slice that is corresponding to the service identifier, receive, using the receiver 903, a second packet sent by the server, where the second packet includes the identifier of the network slice, and send a third packet to a forwarding device using the transmitter 902, where the third packet includes the identifier of the network slice and the identifier of the network slice is used to instruct the forwarding device to use a forwarding resource of the network slice to forward the third packet.

For another additional function that may be implemented by the terminal device 900 and a process in which the terminal device 900 interacts with another device, refer to the description of the terminal device in the method embodiment. Details are not described herein again.

Figure 10:
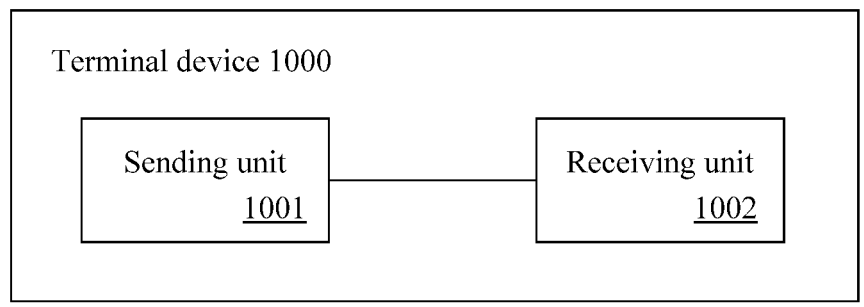
FIG. 10 is a schematic structural diagram of another terminal device according to an embodiment of this application.

FIG. 10 is a schematic structural diagram of a terminal device 1000 according to an embodiment of this application. The terminal device 1000 provided in this embodiment may be applied to the methods of the embodiments in FIG. 2, FIG. 3, and FIG. 5, to implement functions of the terminal device.

As shown in FIG. 10, the terminal device 1000 includes a sending unit 1001 and a receiving unit 1002.

The sending unit 1001 is configured to send a first packet to a server, where the first packet includes a service identifier of the terminal device and the first packet is used to request, from the server, an identifier of a network slice that is corresponding to the service identifier.

The receiving unit 1002 is configured to, after the sending unit 1001 sends the first packet, receive a second packet sent by the server, where the second packet includes the identifier of the network slice.

The sending unit 1001 is further configured to, after the receiving unit 1002 receives the second packet, send a third packet to a forwarding device, where the third packet includes the identifier that is of the network slice and that is received by the receiving unit and the identifier of the network slice is used to instruct the forwarding device to use a forwarding resource of the network slice to forward the third packet.

Optionally, the sending unit 1001 is further configured to, before sending the third packet, send a fourth packet to the server, where the fourth packet includes location information of the terminal device and the fourth packet is used to request an IP address from the server.

The receiving unit 1002 is further configured to, after the sending unit 1001 sends the fourth packet, receive a fifth packet sent by the server, where the fifth packet includes the IP address and the IP address is used as a source IP address of the third packet sent by the terminal device.

For example, the terminal device 1000 shown in FIG. 10 may be the terminal device 900 shown in FIG. 9. The sending unit 1001 may be the transmitter 902 and the receiving unit 1002 may be the receiver 903.

For another additional function that may be implemented by the terminal device 1000 and a process in which the terminal device 1000 interacts with another device, refer to the description of the terminal device in the method embodiment. Details are not described herein again.

Figure 11:
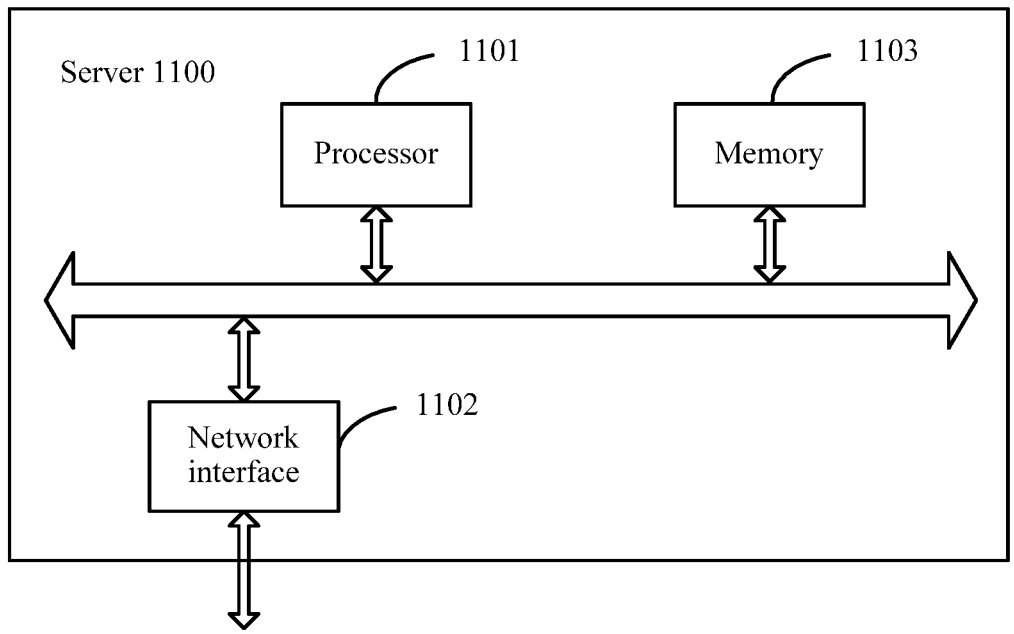
FIG. 11 is a schematic structural diagram of a server according to an embodiment of this application.

FIG. 11 is a schematic structural diagram of a server 1100 according to an embodiment of this application. The server 1100 provided in this embodiment may be applied to the methods of the embodiments in FIG. 2, FIG. 3, and FIG. 6, to implement functions of the server.

As shown in FIG. 11, the server 1100 includes a processor 1101 and a network interface 1102. Optionally, the server 1100 further includes a memory 1103.

The processor 1101 includes but is not limited to one or more of a CPU, an NP, an ASIC, and a PLD. The foregoing PLD may be a CPLD, an FPGA, GAL, or any combination thereof.

The network interface 1102 may be a wired interface, for example, an FDDI or an Ethernet interface. Alternatively, the network interface 1102 may be a wireless interface, for example, a wireless local area network interface.

The memory 1103 may include but is not limited to a CAM, for example, a TCAM or a RAM.

Alternatively, the memory 1103 may be integrated into the processor 1101. If the memory 1103 and the processor 1101 are mutually independent devices, the memory 1103 is connected to the processor 1101. For example, the memory 1103 and the processor 1101 may communicate with each other using a bus. The network interface 1102 and the processor 1101 may communicate with each other using the bus and the network interface 1102 may be directly connected to the processor 1101.

The processor 1101 is configured to receive, using the network interface 1102, a first packet sent by a terminal device, where the first packet includes a service identifier of the terminal device, determine the identifier of the network slice based on an entry of a mapping relationship between the service identifier and the network slice, and send, using the network interface 1102, a second packet to the terminal device, where the second packet includes the identifier of the network slice, the identifier of the network slice is added to a third packet by the terminal device and sent to a forwarding device, and the identifier of the network slice is used to instruct the forwarding device to use a forwarding resource of the network slice to forward the third packet.

For another additional function that may be implemented by the server 1100 and a process in which the server 1100 interacts with another device, refer to the description of the server in the method embodiment. Details are not described herein again.

Figure 12:
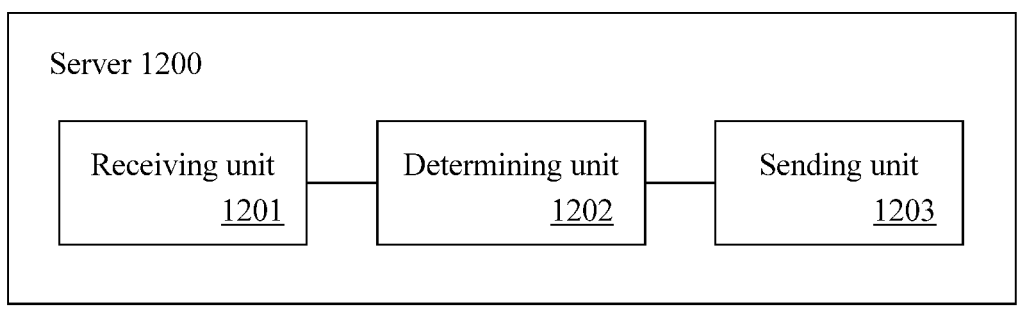
FIG. 12 is a schematic structural diagram of another server according to an embodiment of this application.

FIG. 12 is a schematic structural diagram of a server 1200 according to an embodiment of this application. The server 1200 provided in this embodiment may be applied to the methods of the embodiments in FIG. 2, FIG. 3, and FIG. 6, to implement functions of the server.

As shown in FIG. 12, the server 1200 includes a receiving unit 1201, a determining unit 1202, and a sending unit 1203.

The receiving unit 1201 is configured to receive a first packet sent by a terminal device, where the first packet includes a service identifier of the terminal device.

The determining unit 1202 is configured to determine an identifier of a network slice based on an entry of a mapping relationship between the network slice and the service identifier that is received by the receiving unit 1201.

The sending unit 1203 is configured to send a second packet to the terminal device, where the second packet includes the identifier that is of the network slice and that is determined by the determining unit 1202, the identifier of the network slice is added to a third packet by the terminal device and sent to a forwarding device, and the identifier of the network slice is used to instruct the forwarding device to use a forwarding resource of the network slice to forward the third packet.

Optionally, the first packet further includes location information of the terminal device and the determining unit 1202 is further configured to allocate an IP address to the terminal device based on the location information, where the IP address is used as a source IP address of the third packet sent by the terminal device.

For example, the server 1200 shown in FIG. 12 may be the server 1100 shown in FIG. 10. The receiving unit 1201 and the sending unit 1203 may be the network interface 1102. The determining unit 1202 may be the processor 1101.

For another additional function that may be implemented by the server 1200 and a process in which the server 1200 interacts with another device, refer to the description of the server in the method embodiment. Details are not described herein again.

The embodiments in this specification are all described in a progressive manner, for same or similar parts in the embodiments, refer to these embodiments, and each embodiment focuses on a difference from other embodiments. Especially, a system embodiment is basically similar to a method embodiment, and therefore is described briefly, for related parts, refer to partial descriptions in the method embodiment.

Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A terminal device, comprising:
a non-transitory memory comprising instructions; and
a processor in communications with the non-transitory memory, wherein the instructions cause the processor to be configured to:
send a first packet to a server, wherein the first packet comprises a service identifier of the terminal device, wherein the first packet requests an identifier of a network slice corresponding to the service identifier from the server, and wherein the service identifier of the terminal device identifies a service of the terminal device;
receive a second packet from a software-defined networking (SDN) controller, wherein the second packet comprises the identifier of the network slice; and
send a third packet to a forwarding device, wherein the third packet comprises the identifier of the network slice, wherein the third packet is associated with a forwarding requirement of the network slice in a time period, wherein the forwarding requirement of the network slice changes between different time periods, wherein the identifier of the network slice instructs the forwarding device to use a forwarding resource of the network slice to forward the third packet, wherein forwarding resources for the different time periods are dynamically adjusted, and wherein the third packet is a service packet corresponding to the service identified by the service identifier.

2. The terminal device of claim 1, wherein the instructions further cause the processor to be configured to:
send, before sending the third packet, a fourth packet to the server, wherein the fourth packet comprises location information of the terminal device, and wherein the fourth packet requests an Internet Protocol (IP) address from the server; and
receive a fifth packet from the server, wherein the fifth packet comprises the IP address used as a source IP address of the third packet.

3. A server, comprising:
a non-transitory memory comprising instructions; and
a processor in communications with the non-transitory memory, wherein the instructions cause the processor to be configured to:
receive a first packet from a terminal device, wherein the first packet comprises a service identifier of the terminal device, wherein the first packet requests an identifier of a network slice corresponding to the service identifier from the server, and wherein the service identifier of the terminal device identifies a service of the terminal device;

determine the identifier of the network slice based on an entry of a mapping relationship between the identifier of the network slice and the service identifier;

send the identifier of the network slice to a software-defined networking (SDN) controller; and receive a second packet from the terminal device, wherein the second packet is associated with a forwarding requirement of the network slice in a time period, wherein the forwarding requirement of the network slice changes between different time periods, and wherein forwarding resources for the different time periods are dynamically adjusted.

4. The server of claim 3, wherein the first packet further comprises location information of the terminal device, and wherein the instructions further cause the processor to be configured to allocate an Internet Protocol (IP) address to the terminal device based on the location information.

\* \* \* \* \*